(12) United States Patent
Miyamoto

(10) Patent No.: US 7,845,449 B2
(45) Date of Patent: Dec. 7, 2010

(54) HANDLEBAR LOCK FOR A VEHICLE

(75) Inventor: Takehiro Miyamoto, Shizuoka (JP)

(73) Assignee: Yamaha Hatsudoki Kabushiki Kaisha, Shizuoka-Ken (JP)

(*) Notice: Subject to any disclaimer, the term of this patent is extended or adjusted under 35 U.S.C. 154(b) by 272 days.

(21) Appl. No.: 12/155,252

(22) Filed: May 30, 2008

(65) Prior Publication Data
US 2008/0295551 A1 Dec. 4, 2008

(30) Foreign Application Priority Data

May 30, 2007 (JP) ............................. 2007-143061
May 7, 2008 (JP) ............................. 2008-120935

(51) Int. Cl.
B62D 61/02 (2006.01)
B62K 11/00 (2006.01)
B62H 5/02 (2006.01)

(52) U.S. Cl. .................... 180/219; 280/271; 280/276; 280/279; 70/233

(58) Field of Classification Search ................ 180/219; 280/271, 276, 277, 279, 280; 70/233, 252
See application file for complete search history.

(56) References Cited

U.S. PATENT DOCUMENTS

| 2,576,773 | A | * | 11/1951 | Buxton | 70/185 |
| 2,617,288 | A | * | 11/1952 | Hinds | 70/233 |
| 2,625,813 | A | * | 1/1953 | Hinds | 70/185 |
| 3,863,472 | A | * | 2/1975 | Klingfus | 70/186 |
| 4,509,349 | A | * | 4/1985 | Partridge | 70/233 |
| 5,974,843 | A | * | 11/1999 | Burkholder | 70/233 |
| 6,237,376 | B1 | * | 5/2001 | Surratt | 70/34 |
| 6,497,300 | B2 | * | 12/2002 | Mori et al. | 180/219 |
| 7,509,826 | B2 | * | 3/2009 | Niedrig | 70/186 |
| 2005/0081580 | A1 | * | 4/2005 | Nakai et al. | 70/186 |
| 2007/0277570 | A1 | * | 12/2007 | Yu | 70/233 |
| 2008/0156050 | A1 | * | 7/2008 | Konno et al. | 70/233 |
| 2008/0236216 | A1 | * | 10/2008 | Takeuchi et al. | 70/207 |

FOREIGN PATENT DOCUMENTS

JP  2001-191971  7/2001

* cited by examiner

Primary Examiner—Lesley Morris
Assistant Examiner—Marc A Scharich
(74) Attorney, Agent, or Firm—Rabin & Berdo, P.C.

(57) ABSTRACT

A motorcycle includes a head pipe, a handlebar pipe that is rotatable relative to the head pipe, a main frame extending rearward from the head pipe, and a handlebar lock located on a topside of the main frame to prevent the handlebar pipe from rotating relative to the head pipe.

20 Claims, 10 Drawing Sheets

HANDLEBAR LOCK FOR A VEHICLE

BACKGROUND OF THE INVENTION

1. Technical Field

The present invention relates to a vehicle, for example a motorcycle, and in particular, relates to a handlebar lock for a vehicle.

2. Background Art

A vehicle having a handlebar lock is known. For example, Japanese Patent Document JP-B-3434481 discloses a handlebar lock device for a motorcycle having a head pipe, an under bracket located below the head pipe, a body frame extending rearward from the head pipe, and a handlebar stopper (e.g., a handlebar lock) located below the body frame to prevent the under bracket from rotating relative to the head pipe.

SUMMARY OF THE INVENTION

In one exemplary aspect of the invention, a vehicle has a head pipe, handlebars that rotate relative to the head pipe, thereby steering a wheel, an upper frame extending rearward from the head pipe, and a handlebar lock located on a topside of the upper frame to prevent the handlebars from rotating relative to the head pipe.

In the vehicle in accordance with the above exemplary aspects of the present invention, the handlebar lock located on the topside of the upper frame may prevent the handlebars from rotating relative to the head pipe. Thereby, compared to the case where the handlebar lock is provided below the body frame, the handlebar lock is located closer to a seat that a rider straddles. This allows the rider to operate the handlebar lock in a posture straddling the seat. Thereby, it facilitates the operation of the handlebar lock.

In the vehicle according to the above exemplary aspects of the present invention, the handlebars may include a steering shaft rotatably supported relative to the head pipe, and may further include an upper bracket which is located above the head pipe and connected to the steering shaft. The handlebar lock may prevent the upper bracket from rotating relative to the head pipe. With Such a construction, the handlebar lock readily prevents the handlebars from rotating.

In the vehicle having the handlebar lock designed to prevent the upper bracket from rotating relative to the head pipe, the upper bracket may include a hole formed in a portion of the upper bracket, which faces the handlebar lock, and the handlebar lock includes a pin section insertable into the hole of the upper bracket and prevents the upper bracket from rotating relative to the head pipe by the pin section insertable into the hole of the upper bracket. With such a construction, the upper bracket can be sufficiently prevented from rotating relative to the head pipe by the pin section.

In the vehicle having the handlebar lock whose pin section is inserted into the hole of the upper bracket, the handlebar lock may include a key insertion section, into which a key is inserted, for moving the pin section to be inserted into or removed from the hole of the upper bracket. With such a construction, the pin section of the handlebar lock can be readily inserted into or removed from the hole of the upper bracket by inserting the key into the key insertion section and rotating the inserted key.

In such a case, the key insertion section of the handlebar lock may be oriented outward in a vehicle width direction. With such a construction, the key, which corresponds to the key insertion section of the handlebar lock, can be inserted into the key insertion section from an outside in the vehicle width direction.

In the vehicle according to the above exemplary aspects of the present invention, the handlebar lock may be disposed within the opposite sides of the upper frame in the vehicle width direction. With such a construction, the handlebar lock can be sufficiently prevented from a possible physical shock that can be applied adjacent to the handlebar lock from the vehicle width direction.

In the vehicle according to the above exemplary aspects of the present invention, a lock cover member may be provided to cover the handlebar lock. Therefore, the lock cover member readily protects the handlebar lock.

In the vehicle having the lock cover member, the handlebar lock may include a key insertion section into which a key is inserted, and the lock cover member may open outward in the vehicle width direction and includes a key hole from which the key insertion section is exposed. Therefore, the key insertion section of the handlebar lock is readily exposed from the lock cover member through the key hole.

In the vehicle having the lock cover member, a retainer bracket may be mounted between the upper frame and the handlebar lock. The retainer bracket may include a cover mounting section, and the lock cover member may be fixed to the cover mounting section of the retainer bracket. Therefore, the lock cover member can be fixed to the retainer bracket via the cover mounting section thereof.

In the vehicle having the lock cover member, a seal member may be provided to cover a gap defined between a lateral side of the upper frame and a lateral side of the lock cover member. With such a construction, dust and the like can be prevented from entering an interior of the lock cover member, and therefore, from adhering to the handlebar lock.

In the vehicle according to the above exemplary aspects of the present invention, a fuel tank may be provided on the upper frame, in which the handlebar lock is located between the head pipe and the fuel tank. With such a construction, the head pipe and the fuel tank, which are relatively larger than the handlebar lock, protect the handlebar lock from a physical shock.

In such a case, the vehicle according to the above exemplary aspects of the present invention, a lock cover member may be located to cover the handlebar lock, and a tank cover member may be mounted to the fuel tank to cover the fuel tank, in which the tank cover member covers a top rear portion of the lock cover member. With such a construction, the tank cover member can prevent the lock cover member from moving upward, and therefore, and can further prevent a third person, other than a rider, from removing the lock cover member easily.

In the vehicle according to the above exemplary aspects of the present invention, the upper frame extends rearward from an upper portion of the head pipe and further includes a lower frame extending downward from a lower portion of the head pipe. As described above, because the upper frame is configured to extend rearward from the upper portion of the head pipe, and because the upper frame is placed in a high position, the handlebar lock, which is placed on the topside of the upper frame, can be located in a high position where the rider is able to operate it easily.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially", "essentially" and "nearly", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

The present invention is directed toward a handlebar lock for a vehicle. In the exemplary embodiments, the vehicle is a motorcycle. However, it is contemplated that the concepts of the present invention may be applied to other types of vehicles within the spirit and scope of the invention. For example, the vehicle may be any vehicle that may use a headlight-supporting member and/or a wiring arrangement, such as a bicycle, a three-wheeled vehicle, or an ATV (all terrain vehicle).

Figure 1:
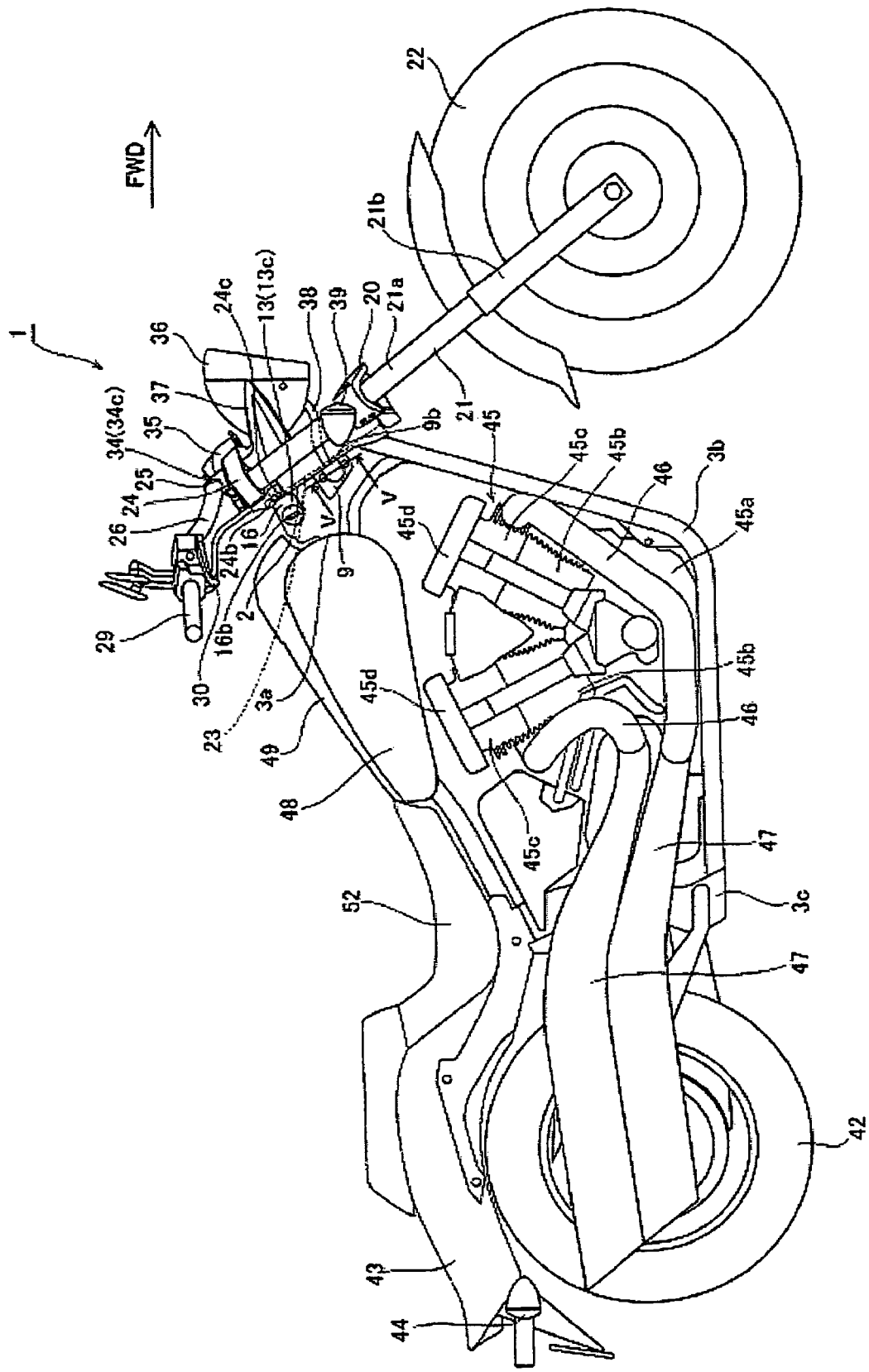
FIG. 1 is a right side view showing a general construction of a motorcycle according to an embodiment of the present invention.
Figure 6:
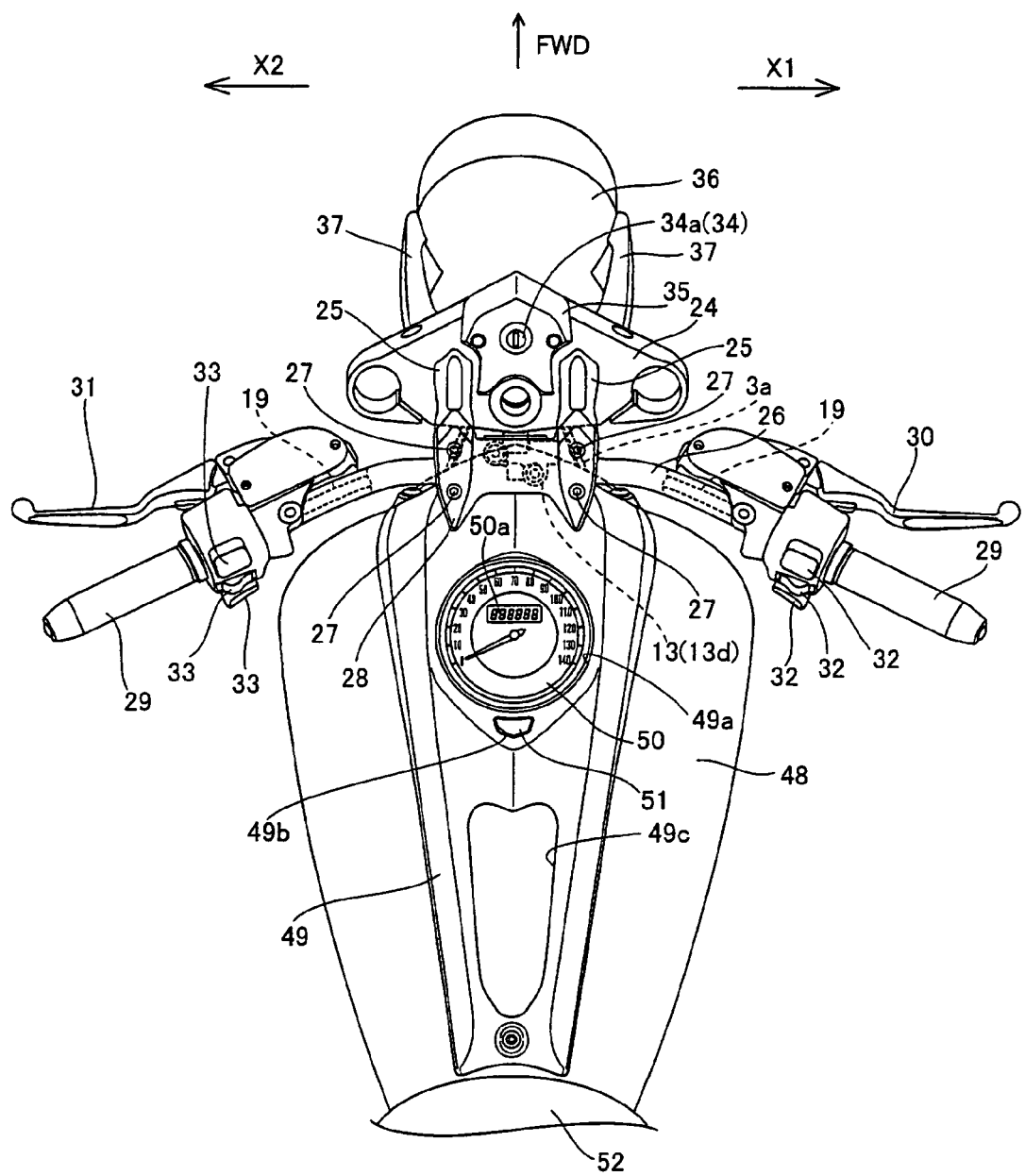
FIG. 6 is a top plan view showing an upper bracket, a tank cover member and their surroundings of the motorcycle shown in FIG. 1.

Referring to FIG. 1, a right side view of an entire a motorcycle according to one embodiment of the present invention is illustrated. In the drawings, the FWD arrow indicates a forward direction in which the vehicle runs. Any reference to a rearward direction will be taken to mean in a direction opposite to the forward direction. Further, any reference to a front and rear of the vehicle will be used in the usual and customary manner. Moreover, any reference to the vehicle width direction will be taken to mean in a direction perpendicular to the FWD arrow, and in the direction of the arrows X1 and X2, as shown in FIG. 6. Additionally when reference is made to right side of the vehicle, this is taken to mean the side as viewed in the direction of the arrow X1, i.e., the right side of the vehicle relative to the FWD. The left side will be the side opposite to the right side.

Figure 2:
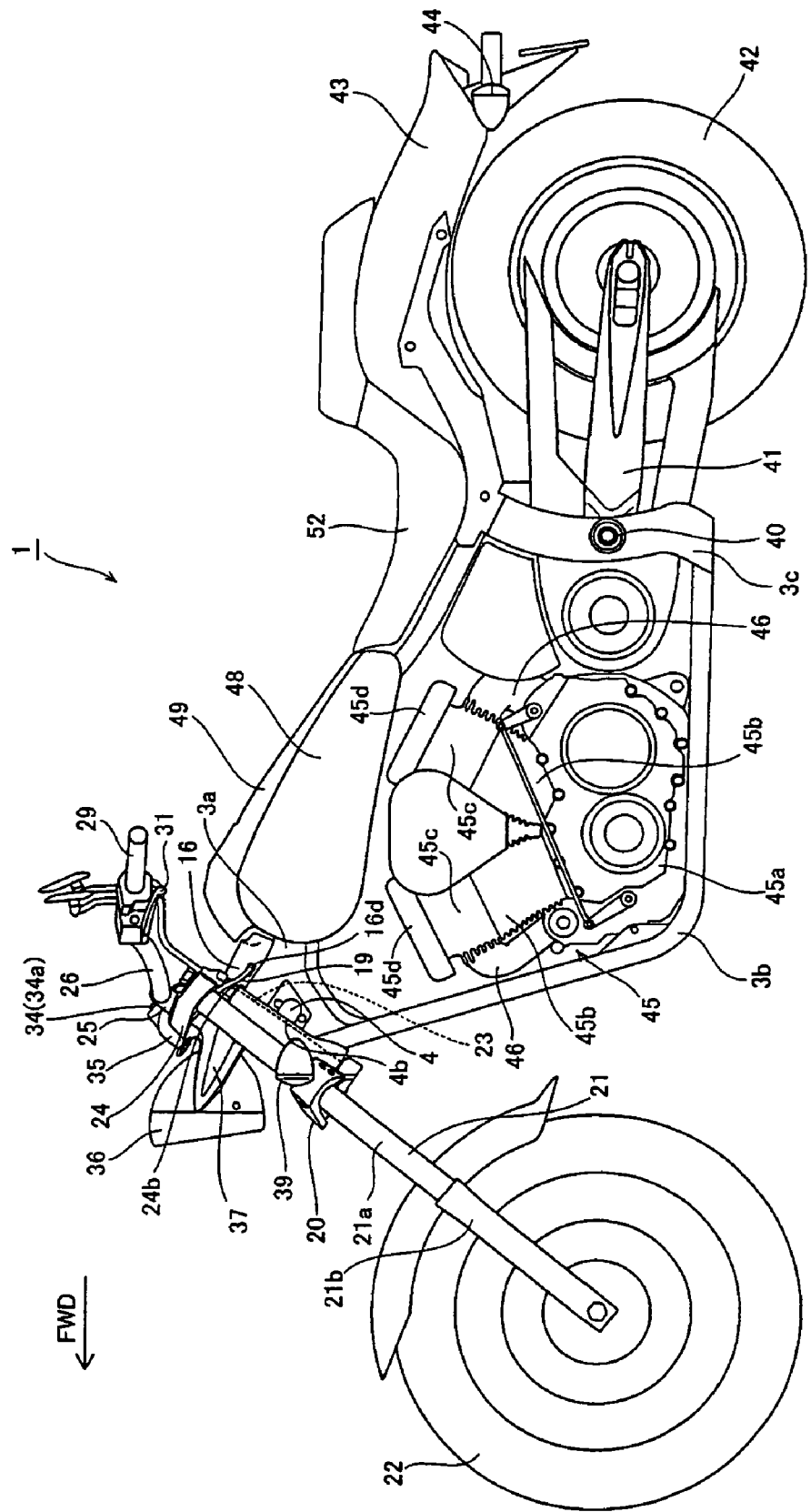
FIG. 2 is a left side view of the motorcycle shown in FIG. 1.
Figure 3:
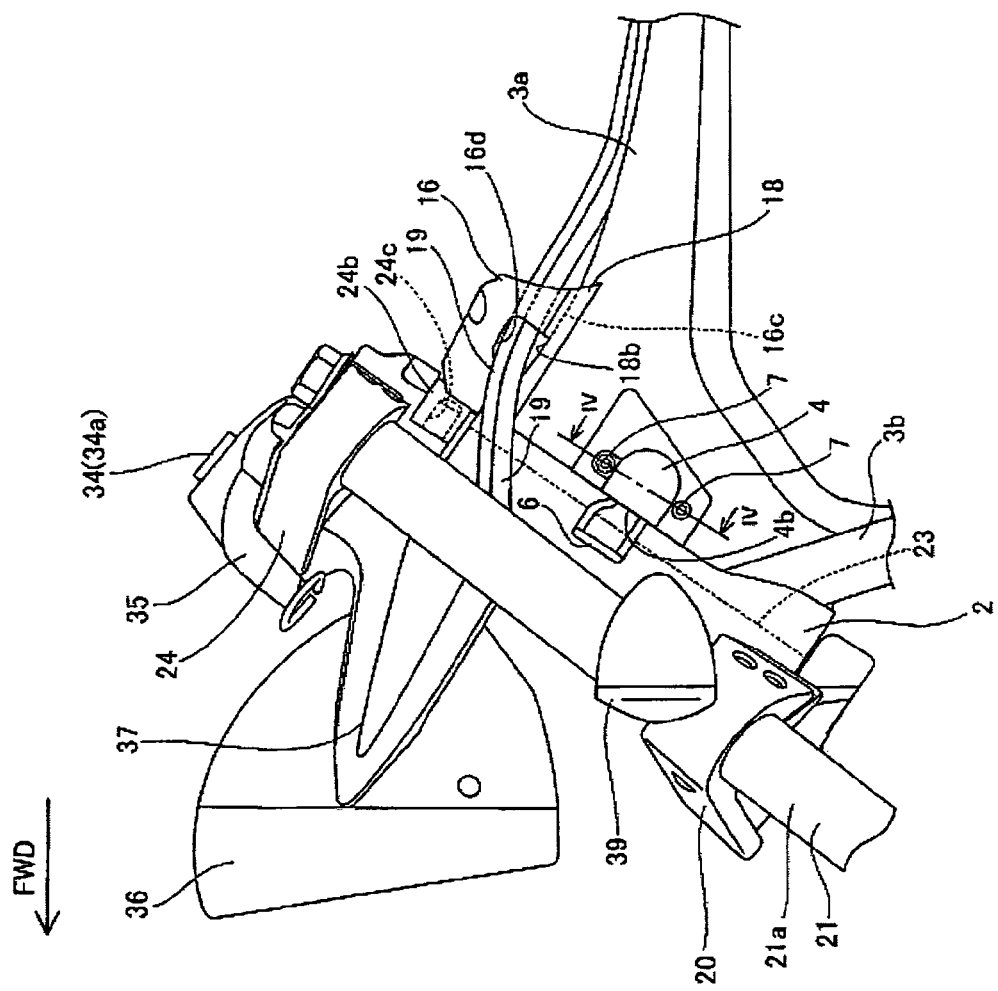
FIG. 3 is a side view showing a structure of a head pipe and its surroundings of the motorcycle shown in FIG. 1.

As shown in FIGS. 1 and 2, a motorcycle 1, according to one aspect of the present invention, includes a main frame 3a located at the rear of a head pipe 2 and extending rearward from the an upper part of the head pipe 2, a down tube 3b extending downward from a bottom part of the head pipe 2, and a connecting frame 3c for connecting the main frame 3a and the down tube 3b in the vertical direction. The vehicle body is comprised of the head pipe 2, the main frame 3a, the down tube 3b, and the connecting frame 3c. As shown in FIGS. 2 and 3, a cover member 4, made of resin for example, is attached to the main frame 3a on its left side adjacent to a rear portion of the head pipe 2.

Figure 4:
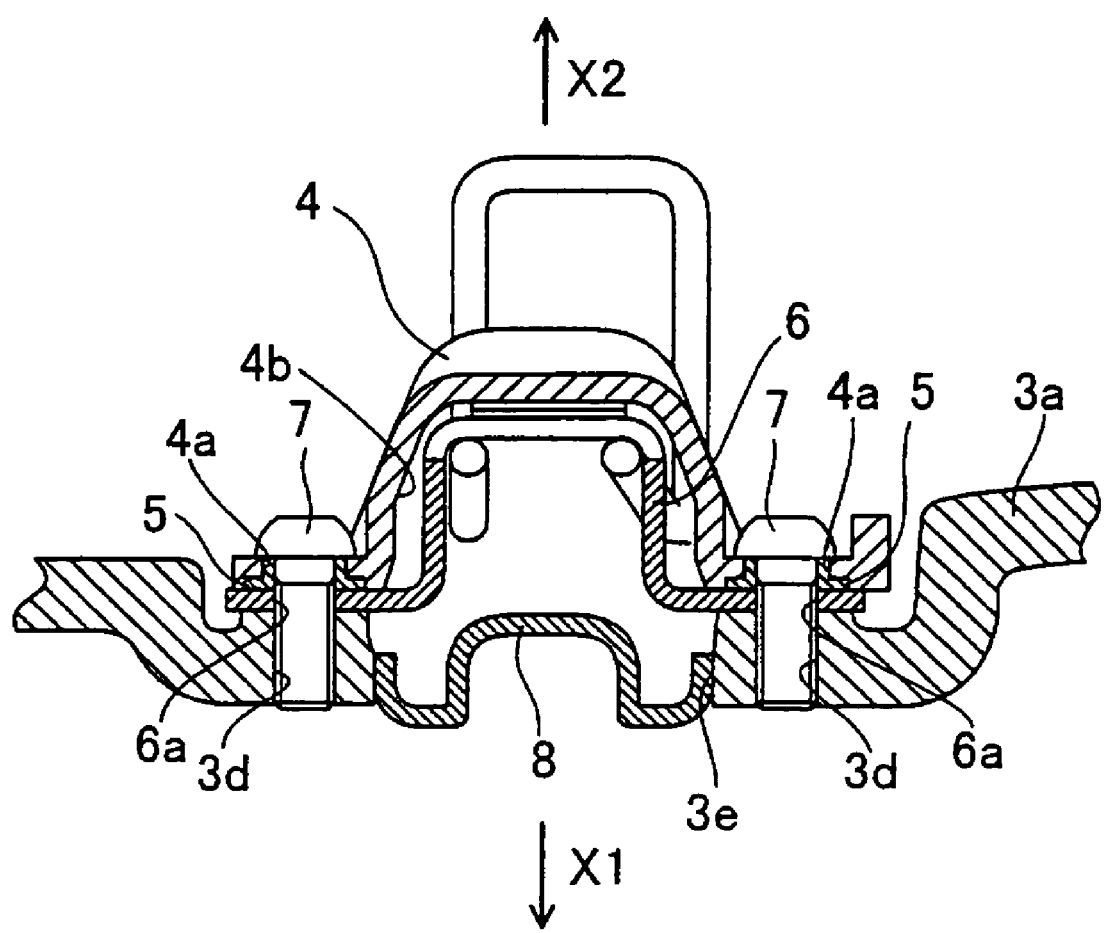
FIG. 4 is a cross-sectional view taken along line IV-IV in FIG. 3.

As shown in FIG. 4, a pair of screw holes 3d is formed on the left side of the main frame 3a, and an opening 3e is formed between the pair of screw holes 3d. The cover member 4 has screw insertion holes 4a. The screw insertion holes 4a penetrate through the cover member 4 on its portions that respectively correspond to the pair of screw holes 3d when the cover member 4 is disposed on the left side of the main frame 3a, so as to cover the opening 3e. Collars 5 are fitted respectively into the pair of screw insertion holes 4a. A guide member 6 for guiding a throttle wire (not shown) to the opening 3e of the main frame 3a is located between the cover member 4 and the lateral side of the main frame 3a. The guide member 6 has screw insertion holes 6a to respectively correspond to the screw insertion holes 4a and the screw holes 3d. The cover member 4 is fixed together with the guide member 6 to the left side of the main frame 3a by screwing two screw members 7 via the screw insertion holes 4a and 6a into the screw holes 3d, respectively.

As shown in FIGS. 2 and 4, the cover member 4 has a cable insertion opening 4b that opens toward the traveling direction. A throttle cable (not shown), for example, may be guided by the guide member 6 and then inserted into the cable insertion opening 4b. As shown in FIG. 4, a rubber damper 8 is fitted into the opening 3e of the main frame 3a. The damper 8 is disposed to cover the opening 3e, and prevents dust and the like from entering the interior of the main frame 3a.

In turn, as shown in FIG. 1, another cover member 9, made of resin, for example, is attached to a rear portion of the head pipe 2 on one side, for example the right side of the main frame 3a.

Figure 5:
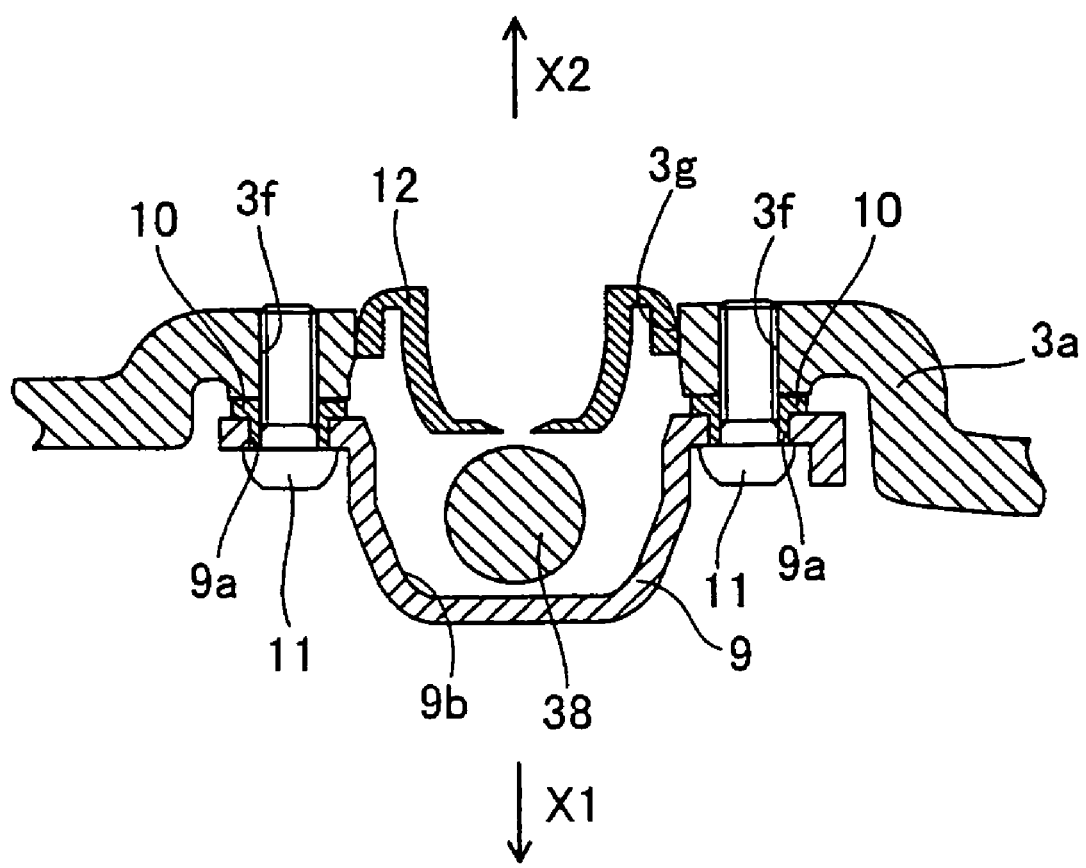
FIG. 5 is a sectional view taken along line V-V in FIG. 1.

Specifically, as shown in FIG. 5, a pair of screw holes 3f is formed on the right side of the main frame 3a, and an opening 3g is formed between the pair of screw holes 3f. The cover member 9 has screw insertion holes 9a. The screw insertion holes 9a are formed through the cover member 9 on its portions that respectively correspond to the pair of screw holes 3f when the cover member 9 is disposed on the right side of the main frame 3a, so as to cover the opening 3g. Collars 10 are fitted respectively into the pair of screw insertion holes 9a. The cover member 9 is fixed to the right side of the main frame 3a by screwing two screw members 11 via the screw insertion holes 9a into the screw holes 3f, respectively.

As shown in FIGS. 1 and 5, the cover member 9 has a hose insertion opening 9b that opens toward the traveling direction. A hose member 38, which will be more fully described later, is inserted into the hose insertion opening 9b. As shown in FIG. 5, a rubber damper 12 is fitted into the opening 3g of the main frame 3a. The damper 12 is disposed to cover the opening 3g, and prevents dust and the like from entering the interior of the main frame 3a.

Figure 7:
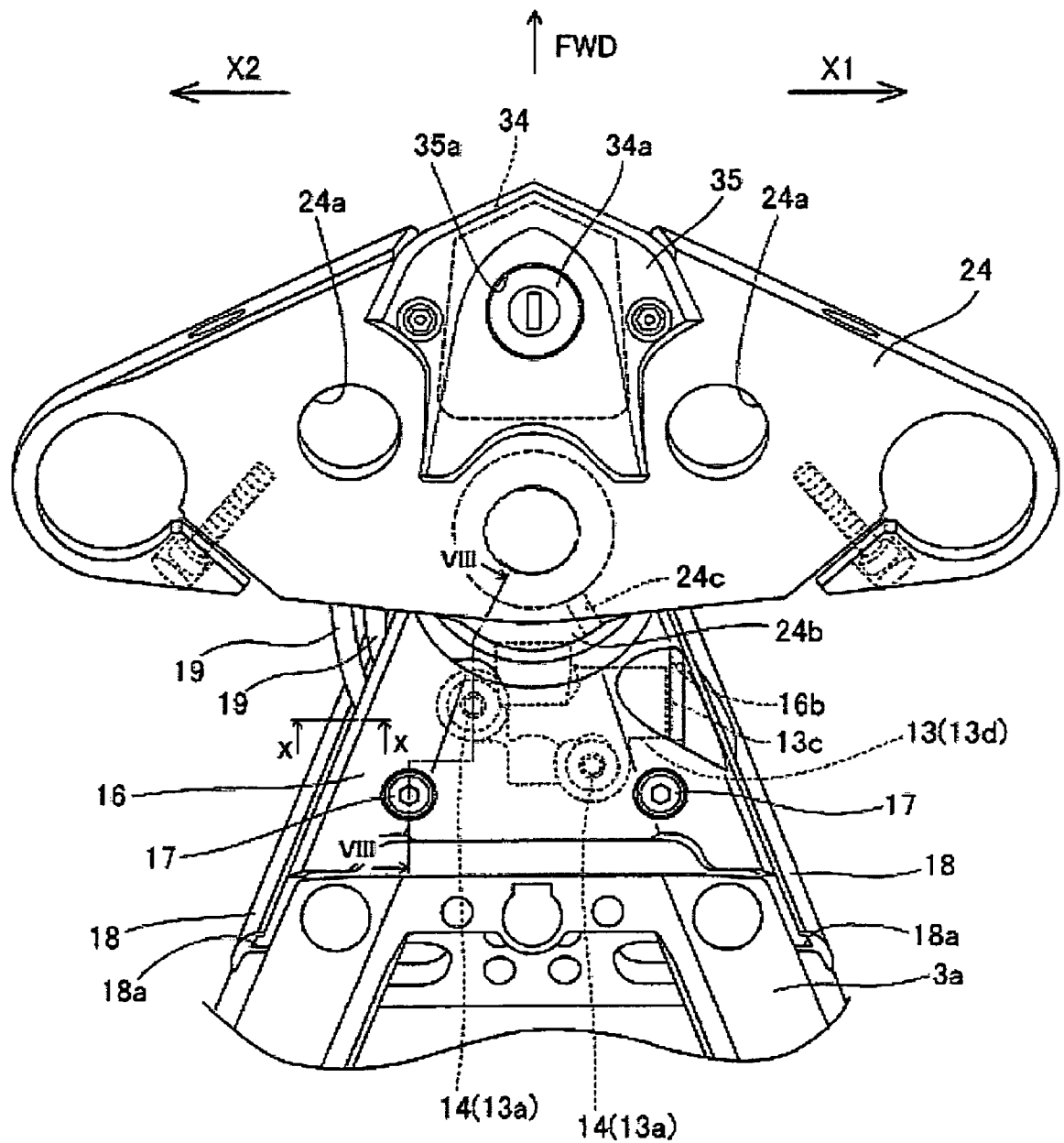
FIG. 7 is a top plan view showing the upper bracket, a lock cover member and their surroundings of the motorcycle shown in FIG. 1.
Figure 8:
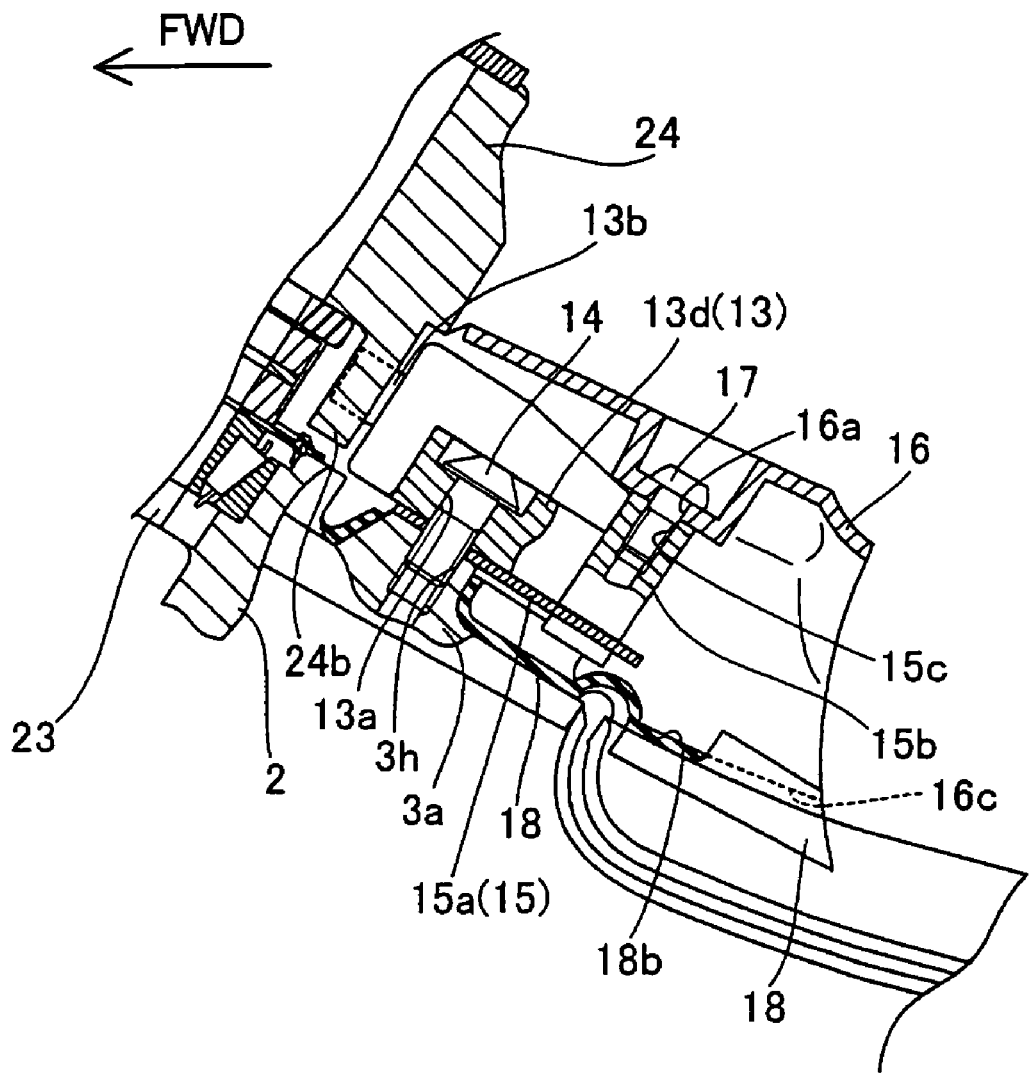
FIG. 8 is a sectional view taken along line VIII-VIII in FIG. 7.

As shown in FIGS. 6 and 7, in this exemplary embodiment of the invention, a handlebar lock 13 is provided on the topside of the main frame 3a. Specifically, as shown in FIGS. 7 and 8, the handlebar lock 13 has two screw insertion holes 13a. Two screw holes 3h (see FIG. 8) are formed on a topside of the main frame 3a, which correspond to the two screw insertion holes 13a. As shown in FIG. 8, a retainer bracket 15 has a plate section 15a located between the handlebar lock 13 and the topside of the main frame 3a. The retainer bracket 15 will be more fully described later. Both the handlebar lock 13 and the plate section 15a of the retainer bracket 15 are attached to the topside of the main frame 3a by screwing screw members 14 via the screw insertion holes 13a into the screw holes 3h.

Figure 9:
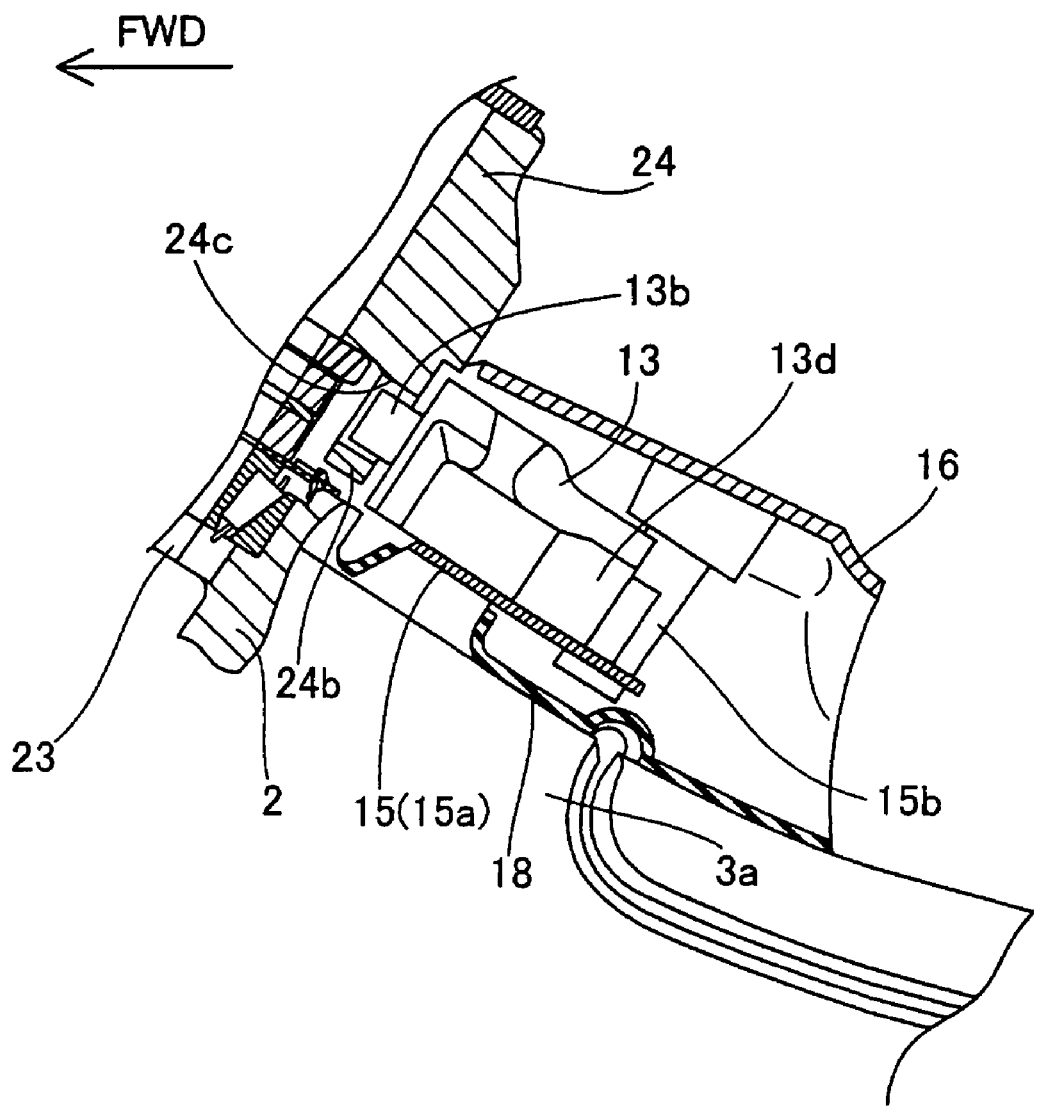
FIG. 9 is a sectional view showing an interior of the lock cover member of the motorcycle shown in FIG. 1.

In this exemplary embodiment, the handlebar lock 13 prevents handlebars (e.g., a handlebar pipe 26 which will be more fully described later) from rotating relative to the head pipe 2. Specifically, as shown in FIGS. 8 and 9, the handlebar lock 13 includes a pin section 13b that is selectively insertable into and removable from a hole 24c (see FIG. 9) of an upper bracket 24, a key insertion section 13c (see FIGS. 1 and 7) via which the pin section 13b is movable into or out from the hole 24c of the upper bracket 24, and a main body section 13d designed to accommodate the pin section 13b and the key insertion section 13c therein. The pin section 13b is provided in the main body section 13d, such that the pin section 13b is protrudable from the main body section 13d in the direction of the FWD arrow. The pin section 13b is designed to be selectively insertable into and removable from the hole 24c of the upper bracket 24. In other words, the pin section 13b selectively protrudes from and returns back to a portion of the main body section 13d that faces a traveling direction of the motorcycle 1, i.e., the direction of the FWD arrow, by inserting a given key (not shown) into the key insertion section 13c (see FIGS. 1 and 7) and rotating the given key in a predetermined direction. As shown in FIGS. 1 and 7, the key insertion section 13c may opens toward the right side of the vehicle.

As shown in FIG. 7, in this exemplary embodiment, the handlebar lock 13, taken from a top view of the motorcycle 1, is located within the opposite sides of the main frame 3a in the vehicle width direction. In other words, the handlebar lock 13 does not protrude beyond the right lateral side or left lateral side of the main frame 3a. This prevents the handlebar lock 13 from any possible physical shock that can be applied adjacent to the handlebar lock 13 from the vehicle width direction.

As shown in FIG. 8, in this exemplary embodiment, the retainer bracket 15 includes a plate section 15a located between the handlebar lock 13 and the topside of the main frame 3a, and a cover mounting section 15b for mounting thereto a lock cover member 16 that will be more fully described later. The plate section 15a is formed into a flat shape, and is sandwiched between the main body section 13d of the handlebar lock 13 and the topside of the main frame 3a. In other words, the retainer bracket 15 is fixed to the main frame 3a such that the retainer bracket 15 is sandwiched between the main frame 3a and the handlebar lock 13. Two cover mounting sections 15b on the plate section 15a extend upward from the flat-shaped plate section 15a (see FIGS. 7 and 8). The cover mounting sections 15b are located at the rear of the handlebar lock 13, respectively. A screw hole 15c is formed through the upper part of each cover mounting section 15b such that the screw hole 15c extends in the direction that the cover mounting section 15b extends.

In this exemplary embodiment, the lock cover member 16 is attached to the retainer bracket 15. Specifically, the lock cover member 16 covers the handlebar lock 13, and has screw insertion holes 16a on its portions that respectively correspond to the screw holes 15c of the retainer bracket 15. The lock cover member 16 is fixed to the cover mounting sections 15b of the retainer bracket 15 by screwing two screw members 17 respectively via the screw insertion holes 16a into the screw holes 15c. As shown in FIGS. 1 and 7, the lock cover member 16 also has an opening 16b on its right side. The opening 16b allows a given key (not shown) to be inserted into the key insertion section 13c of the handlebar lock 13 from the right side of the main frame 3a. The key insertion section 13c of the handlebar lock 13 is exposed toward outside via the opening 16b of the lock cover member 16.

Figure 10:
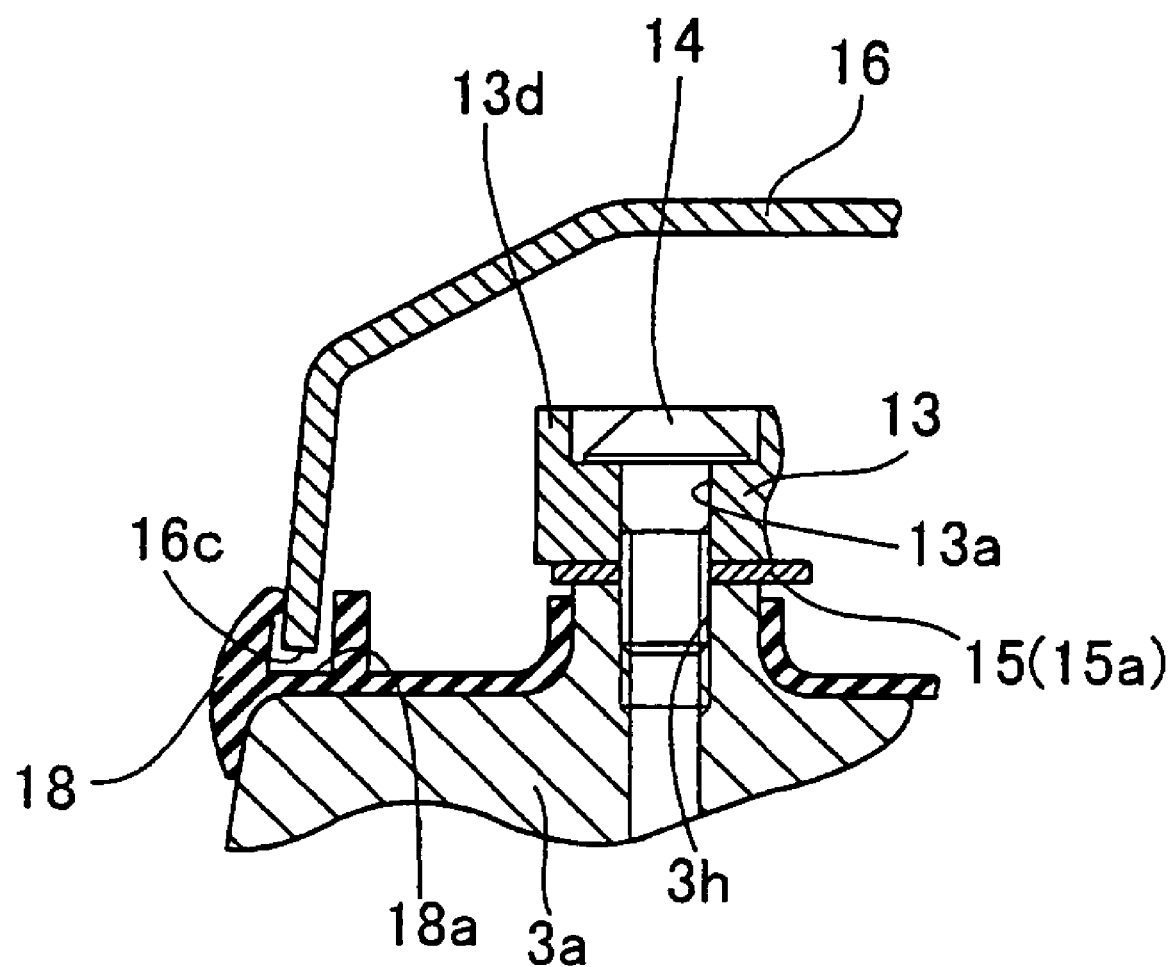
FIG. 10 is a sectional view taken along line X-X in FIG. 7.

As shown in FIGS. 8 and 10, in this exemplary embodiment, a rubber seal member 18 is located on the opposite sides of the main frame 3a and the opposite sides of the lock cover member 16 in the vehicle width direction, such that the seal member 18 covers a gap defined between the main frame 3a and the lock cover member 16. As shown in FIG. 10, the seal member 18 has a concave section 18a that surrounds a lower end surface 16c of the lateral side of the lock cover member 16. The concave section 18a is fitted onto the lower end surface 16c, so that the seal member 18 is prevented from dropping off between the lock cover member 16 and the main frame 3a. As shown in FIG. 3, the lock cover member 16 has a notched section 16d on its lower end surface 16c, and the seal member 18 has a notched section 18b corresponding to the notched section 16d. Wiring members 19 are inserted through these notched sections 16d and 18b, and connected to switches 32 and 33. The wiring members 19 are directed via the interior of the lock cover member 16 to the interior of the main frame 3a.

As shown in FIG. 1, an under bracket 20 is located below the head pipe 2. The under bracket 20 is rotatable relative to the head pipe 2. A front fork 21 has a pair of legs that are individually mounted at the respective ends of the under bracket 20 in the vehicle width direction. Each leg of the front fork 21 each includes an inner tube 21a disposed at an upper part thereof, and an outer tube 21b (see FIG. 1) disposed at a lower part thereof and slidable along the periphery of the inner tube 21a. As shown in FIG. 1, a front wheel 22 is rotatably mounted to a lower part of the respective outer tubes 21b. The front fork 21, on which the front wheel 22 is mounted, supports the vehicle body via the under bracket 20.

As shown in FIG. 3, a steering shaft 23 is fitted to the under bracket 20, and is disposed to extend upward from the under bracket 20. Both the handlebar pipe 26 and an upper part of the steering shaft 23 are connected to an upper bracket 24. A center part, in the vehicle width direction, of the upper bracket 24 covers the head pipe 2. Upper ends of the inner tubes 21a of the front fork 21 are fixed to the upper bracket 24. As shown in FIGS. 1 and 6, the upper bracket 24 has a pair of stay mounting holes 24a (see FIG. 7) on its upper surface. A pair of upwardly-protruding handlebar supporting members, such as handlebar stays 25, is mounted into the pair of stay mounting holes 24a.

As shown in FIG. 6, stay covers 28 are respectively fixed on an upper surface of each of handlebar stays 25 with four screw members 27, so that the handlebar pipe 26, which extends in the vehicle width direction, is disposed between the stay covers 28 and handlebar stays 25. Thus, as the handlebar pipe 26 is turned, the upper bracket 24 will be rotated via the pair of the handlebar stays 25.

In addition, the handlebar pipe 26 has grips at its opposite ends, respectively. A brake lever 30 may be provided in a vicinity of the right side grip 29. A clutch lever 31 may be provided in a vicinity of the left side grip 29. Further, a plurality of switches 32 may be provided adjacent to the right side grip 29 on a side toward the stay cover 28. A plurality of switches 33 may be provided adjacent to the left side grip 29 on a side toward the stay cover 28. The wiring members 19 (see FIG. 3) are respectively connected to the switches 32 and 33, and are disposed inside the handlebar pipe 26. These wiring members 19 transmit signals from the switches 32 and 33, which are manually operated by a rider, to predetermined sections of the vehicle, such as an engine control unit (ECU, not shown).

A main switch cover 35 for accommodating a main switch 34 (see FIG. 7) therein is attached to a front center part of the top bracket 24 in the vehicle width direction. The main switch cover 35 has an opening 35a on its upper surface. The main switch 34 has a key insertion slot 34a fitted in the opening 35a. The key insertion slot 34a opens upward.

As shown in FIGS. 7 and 9, in this exemplary embodiment, a portion of the upper bracket 24, which faces the head pipe 2, is formed into a cylindrical shape extending downward as a cylindrical part 24b. The cylindrical part 24b is formed integral with the upper bracket 24. The cylindrical part 24b has a hole 24c at its portion that corresponds to the handlebar lock 13. As shown in FIG. 7, the hole 24c extends from an outer peripheral surface to an inner peripheral surface of the cylindrical part 24b. In addition, the hole 24c rotates together with the upper bracket 24 when the upper bracket 24 rotates about the steering shaft 23 (see FIG. 9). Rotating the upper bracket 24 until the hole 24c meets the pin section 13b of the handlebar lock 13 allows the pin section 13b thereof to be inserted into the hole 24c of the upper bracket 24. The handlebar lock 13 prevents the upper bracket 24 from rotating relative to the head pipe 2 by inserting the pin section 13b into the hole 24c of the upper bracket 24.

As shown in FIGS. 3 and 6, a pair of headlight supporting members, such as headlight stays 37, for retaining a headlight 36 is provided on a lower surface of the upper bracket 24. The pair of headlight stays 37 respectively extends first toward the arrow X1 direction and the arrow X2 direction from a bottom part of the upper bracket 24 near the main switch 34, then forward and downward in the direction of the FWD arrow. The headlight 36 is mounted on to the pair of headlight stays 37 at their front portions in the direction of the FWD arrow.

In the embodiment of the invention, as shown in FIG. 1, the hose member 38, made of resin for example, is located inside the headlight 36. Wires (not shown), after they are inserted into the interior of the headlight 36, are disposed inside the hose member 38. As shown in FIG. 1, the hose member 38 is directed out of the rear part of the headlight 36, and inserted into the hose insertion opening 9b of the cover member 9.

Flickers 39 are respectively disposed above the under bracket 20. The flickers 39 are attached to the inner tubes 21a of the fork 21 via brackets 36a, respectively.

As shown in FIG. 2, in this exemplary embodiment, a pivot shaft 40 may be provided on the connecting frame 3c for connecting the main frame 3a and the down tube 3b. A front end of a rear arm 41 is pivotally supported by the pivot shaft 40 so as to be swingable in a generally vertical direction. A rear wheel 42 is rotatably mounted on a rear end of the rear arm 41. A rear fender 43 is disposed above the rear wheel 42. A pair of flashing lamps 44 is mounted at a rear portion of the rear fender 43.

As shown in FIGS. 1 and 2, an engine 45 is disposed between the main frame 3a and the down tube 3b. The engine 45 may be an air-cooled engine, and includes a crankcase 45a, cylinder blocks 45b, cylinder heads 45c and cylinder head covers 45d, for example. As shown in FIG. 1, exhaust pipes 46 are connected to the cylinder heads 45c of the engine 45. A rearwardly-extending muffler 48 is connected to the exhaust pipes 46. A fuel tank 48 is disposed above the engine 45. A metallic tank cover 49 is disposed on top of the fuel tank 48.

Specifically, as shown in FIG. 6, the tank cover member 49 is attached to a top surface of the fuel tank 48 in the approximate center in the arrow X1 and X2 directions. The tank cover member 49 has a meter opening 49a with a speedometer 50 fitted thereto on its top surface at a front portion in the direction of the FWD arrow. In addition, a button opening 49b is formed at the rear of the meter opening 49a. A display switching button 51 for switching the modes of a liquid crystal display 50a of the speedometer 50 is fitted to the button opening 49b. Further, an opening 49c is formed at the rear of the button opening 49b on the top surface of the tank cover member 49. Forming the opening 49c thus results in the weight reduction of the metallic tank cover member 49.

In this exemplary embodiment, as shown in FIGS. 1 and 6, a front portion of the tank cover member 49 protrudes forward relative to the fuel tank 48. In other words, the front portion of the tank cover member 49 covers a top rear portion of the lock cover member 16. The tank cover member 49 with these configurations prevents the lock cover member 16 from moving upward, even when the screw members 17 come off so that the lock cover member 16 is unfixed to the main frame 3a. Therefore, the lock cover member 16 is prevented from coming off the top surface of the main frame 3a. A seat 52 is provided behind the fuel tank 48, i.e., at a location distant from the handlebar lock 13 by the longitudinal length of the fuel tank 48.

In this exemplary embodiment, as described above, the handlebar lock 13 for preventing the handlebar pipe 26 from rotating relative to the head pipe 2 is disposed on the topside of the main frame 3a. Thus, the handlebar lock 13 is disposed closer to the seat 52 that a rider straddles, compared to the case where the handlebar lock 13 is provided below the main frame 3a. This allows the rider to operate the handlebar lock 13 in a posture straddling the seat 52, thereby facilitating the operation of the handlebar lock 13.

In this exemplary embodiment, the upper bracket 24 is prevented from rotating relative to the head pipe 2 by inserting the pin section 13b into the hole 24c of the upper bracket 24. Therefore, an insertion of the pin section 13b of the handlebar lock 13 into the hole 24c of the upper bracket 24 readily prevents the upper bracket 24 from rotating relative to the head pipe 2.

In this exemplary embodiment, the handlebar lock 13 is provided with the key insertion section 13c for moving the pin section 13b to be selectively insertable into or removable from the hole 24c of the upper bracket 24. By inserting a key (not shown) into the key insertion section 13c and rotating the inserted key, the pin section 13b of the handlebar lock 13 moves into or out from the hole 24c of the upper bracket 24, thereby being inserted into or removed from the hole 24c.

In this exemplary embodiment, the seal member 18 is provided to cover the gap defined between the side of the main frame 3a and the side of the lock cover member 16 in the vehicle width direction (the arrow X1 and X2 directions). Thus, dust and the like is prevented from entering the interior of the lock cover member 16, and therefore, from adhering to the handlebar lock 13.

In this exemplary embodiment, because the mainframe 3a is configured to extend rearward from the upper portion of the head pipe 2, and thus the mainframe 3a is placed in a high position. Accordingly, the handlebar lock 13, which is disposed in the topside of the mainframe 3a, can be located in a high position so that the rider is able to operate the handlebar lock 13 easily.

It should be understood that the embodiments disclosed herein are given as a mere illustration in all respects, but not given to impose any limitation. The scope of the present invention is defined by the scope of the claims rather than by the descriptions of the embodiments, and includes all modifications falling within the scope of the claims and equivalents thereof.

In the above exemplary embodiments, the key insertion slot of the main switch is solely designed to actuate the main switch, while the key insertion section of the handlebar lock is solely designed to actuate the handlebar lock, so that the key insertion slot of the main switch and the key insertion section of the handlebar lock have the individual functions. However, the present invention is not limited to this case. Instead, the key insertion section of the handlebar lock may have the additional function of actuating the main switch, in which case the key insertion section of the handlebar lock may only be provided.

In the above exemplary embodiments, the key insertion section of the handlebar lock is designed to open outward in the vehicle width direction. However, the present invention is not limited to this case. Instead, the key insertion section may open upward.

In the above exemplary embodiments, the lock cover member is attached to the main frame via the retainer bracket. However, the present invention is not limited to this case. Instead, the lock cover member may be attached directly to the main frame without the retainer bracket.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A vehicle, comprising:
a head pipe;
a handlebar that is rotatable relative to the head pipe, thereby steering a wheel;
an upper frame extending rearward from the head pipe, the upper frame having a top side and left and right lateral sides spaced apart in a vehicle width direction;
a handlebar lock disposed on the top side of the upper frame, the handlebar lock being activatable to prevent the handlebar from rotating relative to the head pipe;
a lock cover member that covers the handlebar lock,
wherein the lock cover member, taken from a top view of the vehicle, does not extend beyond the left and right lateral sides of the upper frame; and
wherein the handlebar lock includes a key insertion section for receiving a key, the key being insertable into the key insertion section in the vehicle width direction.

2. The vehicle according to claim 1, further comprising:
an upper bracket located above the head pipe and connected to the handlebar; and
a steering shaft connected to the upper bracket, with the steering shaft, the handlebar and the upper bracket being rotatable together relative to the head pipe,
wherein the handlebar lock is engageable with the upper bracket to prevent the handlebar, the upper bracket and the steering shaft from rotating relative to the head pipe.

3. The vehicle according to claim 2, wherein:
the upper bracket includes a hole formed in a portion thereof that faces the handlebar lock; and
the handlebar lock includes a pin section that is insertable into the hole of the upper bracket to prevent the upper bracket from rotating relative to the head pipe.

4. The vehicle according to claim 3, wherein the key insertion section operatively moves the pin section into or out from the hole of the upper bracket.

5. The vehicle according to claim 4, wherein the key insertion section is oriented outward in the vehicle width direction.

6. The vehicle according to claim 1, wherein:
the lock cover member opens toward an exterior of the vehicle in the vehicle width direction and includes a key hole via which the key is insertable into the key insertion section.

7. The vehicle according to claim 1, further comprising a retainer bracket mounted between the upper frame and the handlebar lock, wherein:
the retainer bracket includes a cover mounting section; and
the lock cover member is fixed to the cover mounting section.

8. The vehicle according to claim 1, further comprising a seal member filling a gap between the upper frame and the lock cover member.

9. The vehicle according to claim 1, further comprising a fuel tank provided on the upper frame, wherein the handlebar lock is interposed between the head pipe and the fuel tank.

10. The vehicle according to claim 9, further comprising:
a tank cover member attached to the fuel tank, which covers the fuel tank, wherein the tank cover member is arranged to cover a rear portion of the lock cover member.

11. The vehicle according to claim 1, further comprising a lower frame, wherein the upper frame extends rearward from an upper portion of the head pipe and the lower frame extends downward from a lower portion of the head pipe.

12. In combination, components for a vehicle, the vehicle having a head pipe and an upper frame extending rearward from the head pipe, the upper frame having a top side and left and right lateral sides spaced apart in a vehicle width direction, the combination comprising:
an upper bracket positioned above the head pipe, and having a hole formed therein;
a handlebar lock disposed on the top side of the upper frame, the handlebar lock including a pin section, the pin section being insertable into the hole of the upper bracket to prevent the upper bracket from rotating relative to the head pipe; and
wherein the handlebar lock includes a key insertion section for receiving a key, the key being insertable into the key insertion section in the vehicle width direction.

13. The combination according to claim 12, wherein the key insertion section operatively moves the pin section into or out from the hole of the upper bracket.

14. The combination according to claim 13, wherein the key insertion section faces an outside of the vehicle in the vehicle width direction.

15. The combination according to claim 12, wherein the handlebar lock, taken from a top view of the vehicle, does not extend beyond the left and right lateral sides of the upper frame.

16. The combination according to claim 12, further comprising a lock cover member that covers the handlebar lock.

17. The combination according to claim 16, wherein the lock cover member opens toward an exterior of the vehicle in the vehicle width direction and includes a key hole via which the key is insertable into the key insertion section.

18. A vehicle, comprising:
a head pipe;
a steering shaft;
a handlebar;
an upper frame having a top side and left and right lateral sides spaced apart in a vehicle width direction;

an upper bracket having a hole, and being located above the head pipe and connected to an upper part of the steering shaft, the upper bracket being rotatable, together with the steering shaft and the handlebar, relative to the head pipe;

an under bracket disposed below the head pipe; and a handlebar lock disposed on the top side of the upper frame, the handlebar lock including a pin section that is insertable into the hole of the upper bracket to prevent the handlebar from rotating relative to the head pipe, and is removable from the hole of the upper bracket to allow the handlebar to rotate relative to the head pipe, wherein the handlebar lock includes a key insertion section for receiving a key, the key being insertable into the key insertion section in the vehicle width direction.

19. The vehicle according to claim 18, wherein:

the pin section is selectively insertable into and removable from the hole of the upper bracket by turning the key received in the key insertion section.

20. The vehicle according to claim 19, wherein the key insertion section faces an outside of the vehicle in the vehicle width direction.

* * * * *